United States Patent [19]
Ruddy et al.

[11] Patent Number: 5,001,965
[45] Date of Patent: Mar. 26, 1991

[54] PISTON AND PISTON RING

[75] Inventors: Brian L. Ruddy, Wetherby; Jeremy W. Holt, Bradford, both of England

[73] Assignee: AE PLC, Rugby, England

[21] Appl. No.: 160,939

[22] Filed: Feb. 26, 1988

Related U.S. Application Data

[63] Continuation of Ser. No. 821,253, Jan. 22, 1986, abandoned.

[30] Foreign Application Priority Data

Feb. 16, 1985 [GB] United Kingdom ................. 8504008

[51] Int. Cl.⁵ ............................. F16J 9/12; F16J 9/20
[52] U.S. Cl. ........................................ 92/193; 92/172; 277/138; 277/176; 277/198
[58] Field of Search ............... 277/184, 170, 174, 176, 277/192, 198, 216, 138; 92/172, 193

[56] References Cited

U.S. PATENT DOCUMENTS 3,826,508  7/1974  Packard .......................... 277/171 X

FOREIGN PATENT DOCUMENTS

| 67175 | 1/1983 | European Pat. Off. . |
| 1476105 | 6/1972 | Fed. Rep. of Germany . |
| 2933702 | 11/1980 | Fed. Rep. of Germany . |
| 233429 | 7/1944 | Switzerland . |
| 341798 | 1/1931 | United Kingdom . |
| 1146260 | 3/1969 | United Kingdom . |
| 2117868 | 10/1983 | United Kingdom . |

OTHER PUBLICATIONS

PT/Werktuigbouw, vol. 40, No. 12, p. 131 Rijswijk, Netherlands; P. N. Klaver "Twee zuigerveren in plaats van drie", 12/85.

*Primary Examiner*—Allan N. Shoap
*Attorney, Agent, or Firm*—William R. Hinds

[57] ABSTRACT

Pistons and associated piston rings are described for use in internal combustion engines. The piston and piston ring comprise an annular piston ring groove having two radially extending walls and an axially extending wall; a compression ring received in the piston ring groove for sealing engagement with an associated cylinder wall or liner; a recess in the compression ring extending in an outwardly direction; an auxiliary sealing ring in permanent but deflectable contact with the axially extending wall of the annular piston ring groove and penetrating the recess in the compression ring; the arrangement being such that the auxiliary sealing ring does not physically limit the extent of movement of the compression ring in the annular piston ring groove. Pistons are described where two conventional compression rings are replaced by one. Test results are also presented.

15 Claims, 4 Drawing Sheets

PISTON AND PISTON RING

This is a continuation of application Ser. No. 821,253 filed Jan. 22, 1986, and now abandoned.

The present invention relates to pistons and piston rings for use in, for example, internal combustion engines.

Piston rings are employed on a combustion engine piston both to prevent combustion gases escaping from the combustion space, and which is known as blowby, and to limit the amount of lubrication oil entering the combustion space which would otherwise cause excessive oil consumption. In order to achieve these aims, three or more rings are generally provided. Modern internal combustion engines often employ a three-ring piston ring pack comprising two compression rings in the upper and centre positions and an oil control ring in the lower position. It has generally been considered that for practical purposes, two compression rings in contact with the cylinder wall are the minimum necessary for efficient control of combustion gas blowby allied to acceptable oil consumption.

The ability to produce an efficient piston having only one compression ring in contact with the cylinder wall would bring many advantages. Firstly, there are the dimensional consequences such as the piston compression height and weight being reduced and secondly, benefits in reduced friction. A reduction of the compression height, that is, the distance between the piston crown and gudgeon pin axis, allows an overall reduction of engine height which consequently means lower hood lines in cars allowing improved aerodynamics, etc. Reduced, piston weight also leads to reductions in stresses imposed on gudgeon pins, connecting rods, bearings, crankshaft, etc., which may all be made smaller and, therefore, lighter.

Various methods of improving the gas sealing of compression rings have been proposed. These include rings within a single groove but having multiple elements bearing against the cylinder wall. Such an arrangement is described by Schunichi in European Patent Application No. 0 069 175. Other methods comprise the provision of an auxiliary ring which lies in two grooves, one in the inner axial face of the piston ring and the other in the axial wall of the piston ring groove, the auxiliary ring thus forms a seal between the main ring and the piston. Examples of this type of ring assembly are described by Graham in GB 2,117,868A and Williams in U.S. Pat. No. 2,228,495. The embodiments described by Graham show a relatively deep groove in the piston ring groove for the auxiliary ring comparable with the groove depth in the inner axial face of the piston ring which bears against the cylinder wall. The auxiliary ring in some embodiments is shown as a free floating ring in the grooves, neither expanding outwardly against the outer piston ring, nor contacting the inner wall of its own groove in the piston. In one instance the auxiliary ring is shown as a two-piece assembly substantially as two semi-circular elements. The auxiliary ring is also shown in two embodiments as being a rigid flange-like feature extending outwardly from the inner axial face of the piston ring groove.

Williams describes an arrangement in which an inner ring fits into an annular groove cut into the axial wall of the piston ring groove and again cooperates with a corresponding groove in the inner axial face of the piston ring which bears against the cylinder wall.

It is necessary in Williams, however, that the inner auxiliary or sealing ring fulfils an expander function to increase the force with which the main piston ring bears against the cylinder walls. Additionally, it is necessary that the inner sealing ring is a "snug" fit in its grooves in the piston wall and in the main ring in order to prevent tilting and limit movement of the main ring in the piston axial direction. For the sealing ring to be a "snug" fit in both grooves it is necessary that the axial depth of each groove is equal. The sealing ring groove in the piston wall should also be of greater radial depth than the corresponding groove in the piston ring. It is clear, therefore, that the sealing action of the inner ring is mostly due to it being a "snug" fit in its grooves and also due to a labyrinth sealing effect.

Both Graham and Williams show the inner sealing ring to have straight, parallel and concentric inner and outer axial faces and indeed Williams makes a point of this in the text.

It has now been found that unexpectedly good results are given when the inner auxiliary ring and the outer main ring are so constructed that the inner ring does not limit the movement of the outer ring in its groove and furthermore that the inner ring is able to tilt and form seals with the outer main ring.

According to the present invention a piston comprises: a piston body with at least one annular piston ring groove in the piston body, the groove having two radially extending walls and an axially extending wall, a main piston ring received in the piston ring groove, the main ring having an outer generally axially extending face for sealing engagement with an associated cylinder wall and having an inner generally axially extending face, the main ring having a recess opening into said inner face, the recess extending in an outwardly direction toward the outer face, and an annular auxiliary sealing ring in constant but pivotable gripping contact with the axially extending wall of the annular piston ring groove, one end of the sealing ring extending into the recess in the inner face of the main ring, the arrangement being such that the auxiliary sealing ring does not physically limit the extend of movement of the main ring in the annular piston ring groove.

The recess may be in the form of a groove in the inner axial face of the main ring or in the form of a rebate in the top face of the main ring.

The upper and lower radial walls of such a groove in the inner face of the main ring may not necessarily be parallel, but may lie at an angle of between 0° and 4° to a radial plane passing through the groove. The upper groove face may extend upwardly and to the outside of the groove and the lower groove face may extend downwardly and to the outside of the groove. In section, therefore, the groove may be frusto-conical.

The depth of the groove in the main ring is preferably not less than 0.5 mm and more preferably not less than 1 mm.

Preferably, there may be a shallow depression in the axially extending wall of the annular piston ring groove, the depression being sufficient to locate the inner auxiliary sealing ring in, for example, the centre of the axially extending wall to facilitate fitting of the main ring to the piston body and to limit axial movement of the inner auxiliary ring in operation.

Preferably, the auxiliary sealing ring is in the form of a steel rail having a rounded inner endface such that deflection by pivoting about the inner end face is facilitated.

It is preferable that the inner auxiliary sealing ring extends beyond the inner axial face of the main ring to a distance of at least 0.5 mm and certainly not less than 0.25 mm and more preferably to a depth of greater than 1 mm.

In order that the invention may be more fully understood, embodiments will now be described by way of example only with reference to the accompanying drawings of which:

Figure 1:
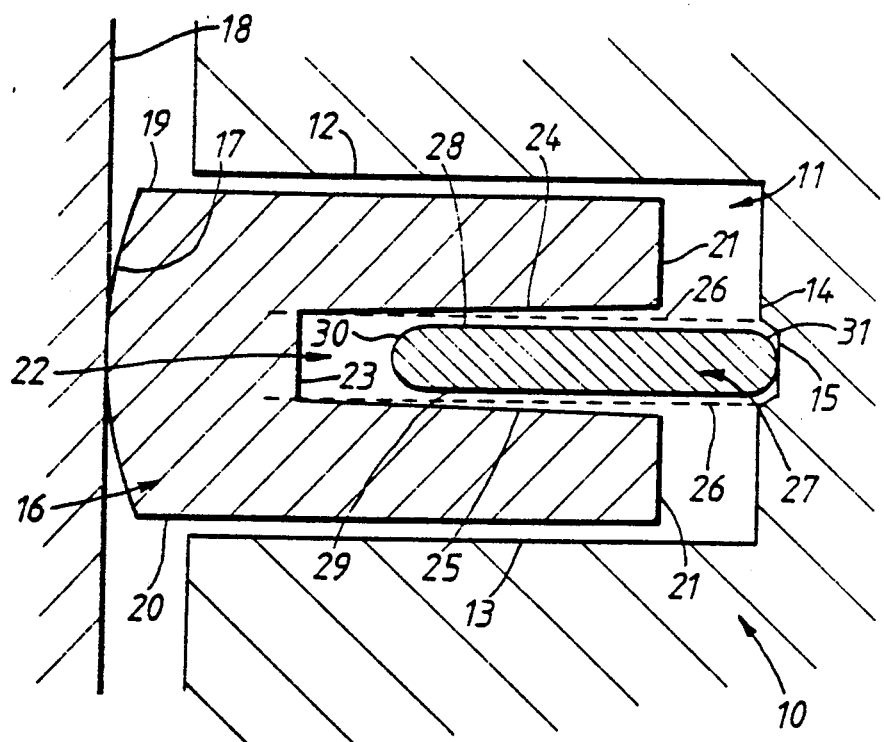
FIG. 1 shows an axial section through part of a stationary piston and piston ring according to the invention within a cylinder.

Referring now to FIGS. 1 to 4 where the same features are denoted by common reference numerals.

In FIG. 1 a piston body is shown generally at 10. In the body 10 is a circumferential piston ring groove, also shown generally at 11. The groove 11 comprises two parallel radial faces 12 and 13 and an inner axially extending face 14. In the centre of the face 14 is a shallow circumferential depression 15. Lying in the groove 11 is a main compression piston ring made from cast iron and shown generally at 16. The ring 16 comprises an outer axial face 17 which bears against a cylinder wall 18, two substantially parallel radial faces 19 and 20 and an inner axial face 21. In the inner axial face 21 is a groove, shown generally at 22. The groove 22 comprises an axial face 23 and two radial faces 24 and 25 which lie at an angle of approximately 2° to horizontal planes 26 (shown as dotted lines) passing through the groove 22. Seated in the depression 15 and also penetrating the groove 22 is an auxiliary sealing ring shown generally at 27. The ring 27 is a circular split steel rail formed to a diameter less than that of the piston 10 such that the rail is permanently in contact with the piston 10 when fitted. The ring 27 comprises two parallel radial faces 28 and 29 and rounded ends 30 and 31.

In a typical piston of about 68 mm diameter, the main compression ring 16 may have an axial thickness of about 1.5 mm and a radial thickness of about 3.25 mm. The groove 22 has a radial depth of approximately 1.8 mm and a minimum axial depth, defined by the wall 23 of about 0.6 mm. The ring 27 has a radial thickness of about 2.5 mm and an axial thickness of approximately 0.5 mm. Penetration of the ring 27 into the groove 22 varies between approximately 1.25 and 1.75 mm under normal running conditions. The depression 15 may be between 0.05 and 1.0 mm in radial depth but typically about 0.25 mm.

Figure 2:
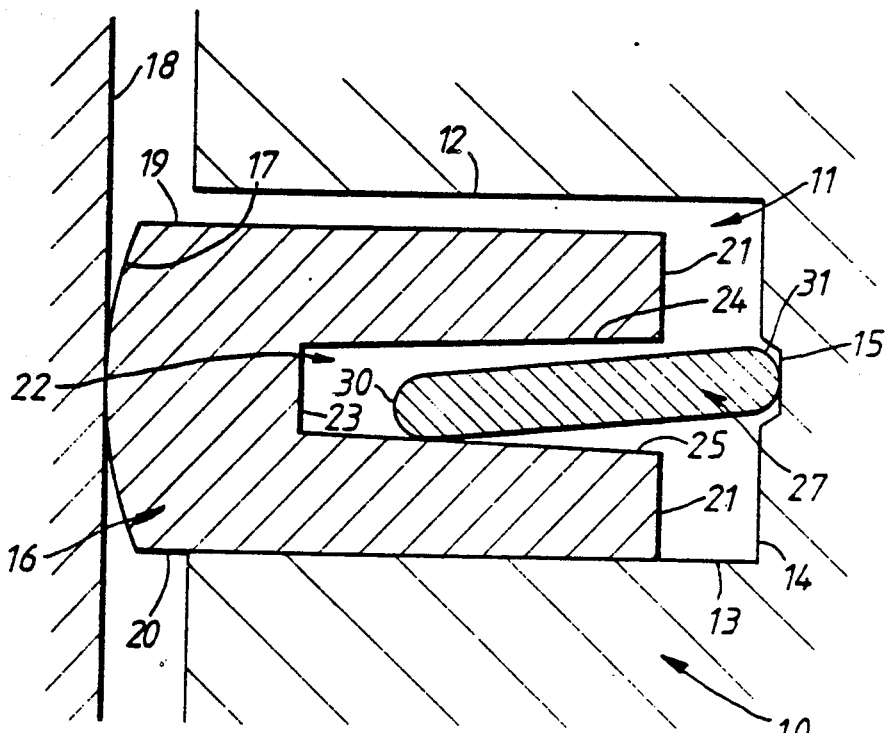
FIG. 2 shows the piston and piston ring of FIG. 1 during a power stroke in an internal combustion engine.

FIG. 2 shows the configuration assumed by the ring components during a combustion stroke in an internal combustion engine. Gas pressure from the burning fuel charge forces the main compression ring 16 downwards such that the face 13 of the piston ring groove 11 and face 20 of the ring 16 are in intimate contact. The end 30 of the auxiliary sealing ring 27 is also forced in a downwardly direction by pivoting about the end face 31 seated in the depression 15 to contact the face 25 of the groove 22. Gas pressure also forces the ring 16 in an outwardly direction producing a radial force to seal the face 17 against the cylinder wall 18, thus effecting an efficient gas seal. Blow-by around the back of the piston ring 16 is minimised by the seals formed between the end 31 and depression 15 and between the end 30 and groove face 25.

It will be noted that the gas pressure forcing the ring 16 in an outwardly direction to seal the face 17 against the cylinder wall 18 may substantially only act radially on the upper portion of face 21 and on face 23. The result of this is that friction between the ring face 17 and the cylinder wall 18 is reduced compared with a conventional ring. Furthermore, because of the groove 22 machined in the back of the ring 16, the tangential tension or load applied by the ring in the radial direction against the cylinder wall 18 is also reduced giving an additional reduction in friction betwen ring and cylinder. The reduction in tangential tension is of the order of 10 to 20% and the reduction in the radial force generated by the gas pressure is of the order of 20 to 40%.

Figure 3:
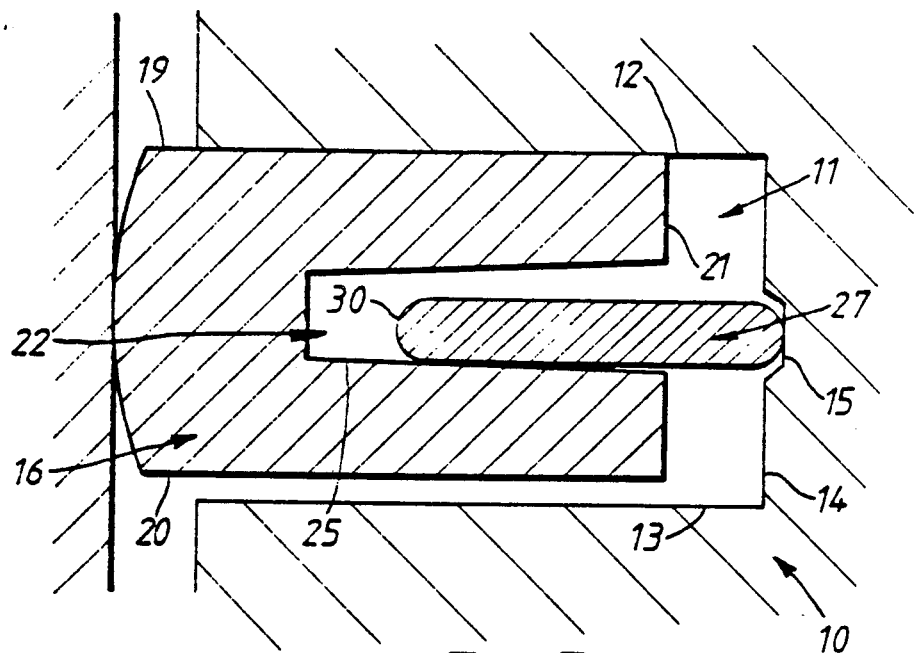
FIG. 3 shows the piston and piston ring of FIG. 1 sealing against a downward flow of gas.
Figure 4:
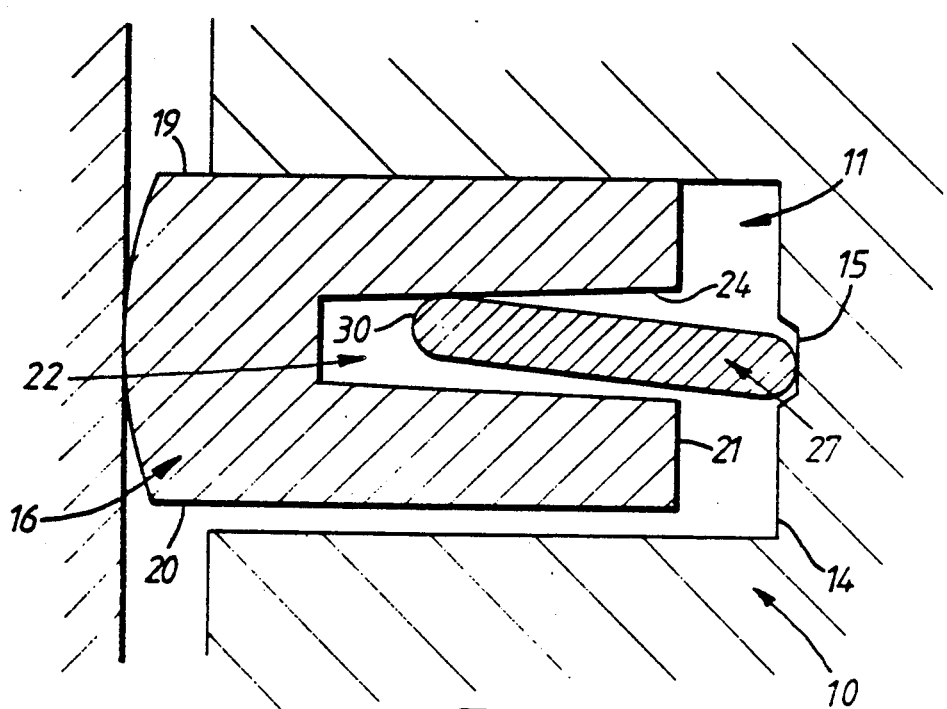
FIG. 4 shows the piston and piston ring of FIG. 1 sealing against an upward flow of oil.

FIG. 3 shows the configuration assumed by the ring components at the top of an exhaust stroke, for example, where the piston 10 has just changed direction to descend in the cylinder, but piston ring 16 inertia carries the ring to the top of the ring groove 11 where face 19 and face 12 meet. If there is still any gas pressure above the ring 16 it will tend to keep the auxiliary sealing ring 27 depressed with its end 30 sealing against the face 25, thus preventing blowby. Otherwise the components may adopt the configuration shown in FIG. 4 where the end 30 of the sealing ring 27 seals against the top face 24 of the groove 22. In this configuration, the sealing ring 27 prevents passage of oil into the space above the sealing ring 27 where it could be burnt by the combustion gases. This could cause higher oil consumption and possible carbonisation and clogging of the various working clearances.

In general, the angular and axial positions adopted by the piston ring and the sealing ring will depend upon the balance of forces and turning moments arising from gas pressures, component inertia and interfacial friction.

It has been found in pistons according to the invention where two conventional top compression rings have been replaced by one composite ring as described above, that reductions of piston compression height of 10 to 15% may be achieved. On a piston of about 68 mm diameter a reduction of compression height of 13% over the conventional piston was achieved. This reduction of compression height on the 68 mm piston also resulted in a reduction of piston weight of 8% leading potentially to other benefits as described above. In other piston embodiments, weight reductions of up to 10% may be achieved.

Pistons may be produced as stated above where two conventional top compression rings are replaced by one composite ring, giving benefits directly attributable to the composite piston ring per se plus the additional indirect benefit in that friction is still further reduced by elimination of the second conventional compression ring. However, where it is considered that reduction of gas blowby levels and/or oil consumption may be more important considerations in an existing engine, for example, than reduction of compression height etc., it is of course advantageous in terms of these parameters to employ a composite ring as described above as the top ring of a three-ring piston. The second ring may be another composite ring. Even where a three-ring piston is retained, composite rings as described still confer benefits of reduced ring-to-cylinder friction in addition to reduced blowby and oil consumption. The second or third ring of a two or a three-ring piston will usually be an oil control-type ring.

Extensive engine testing on dynamometers has been undertaken on pistons according to the invention with total testing in excess of 3500 hours of engine running having been accumulated. Pistons utilising a single composite compression ring (and a conventional conformable oil control ring) and pistons having a composite top compression ring and a conventional one-piece second compression ring (plus oil control ring) have been tested in engines. The results of these engine tests have been compared with tests carried out on standard production engines having conventional three-ring pistons. The results of the engine dynamometer tests are shown in Table 1.

TABLE 1

| ENGINE | NO. OF COMP. RINGS | TYPE OF COMPRESSION RINGS | MAX. BLOW-BY L/min | OIL CONS. cc/hr |
|---|---|---|---|---|
| 1.6 L Ford 4 cyl. gasoline | 1 | One composite | 31 | 30 |
|  | 2 | One composite One conventional | 25 | 14 |
|  | 2 | Two conventional (Standard production) | 25 | 40 |
| 2.0 L General Motors 4 cyl. gasoline | 1 | One composite | 34 | 12.5 |
|  | 2 | Two conventional (Standard production) | 27 | 14 |
| 1.6 L British Leyland 4 cyl. gasoline | 1 | One composite | 33 | 40 |
|  | 2 | Two conventional (Standard production) | 32 | 30 |

In the above table all engine pistons employed a conventional oil control ring.

It may be seen from Table 1 that the single composite compression ring produces blowby levels which are comparable with those of a conventional three-ring piston and entirely adequate in performance. The oil consumption figures, however, are in all cases superior when using a single composite ring compared with the standard conventional piston. In the case of the 1.6 L Ford engine a single composite ring has given an improvement of 25% over the standard engine and when used in conjunction with a conventional second compression ring the improvement is over 60%.

A vehicle test, covering in excess of 30,000 miles, of a Ford Escort using 1.6 L gasoline engine which had already completed 400 hours running on a dynamometer and having a single composite compression ring and conventional oil control ring resulted in an oil consumption of 35,000 mpg (Imperial) under normal driving conditions.

A second vehicle test of a British Leyland Montego using a 1.6 L engine which had also completed 400 hours dynamometer running and fitted with a single composite compression ring and a conventional oil control ring resulted in an oil consumption of 24,000 m.p.g. (Imperial) over 10,000 miles of normal driving conditions.

Figure 5:
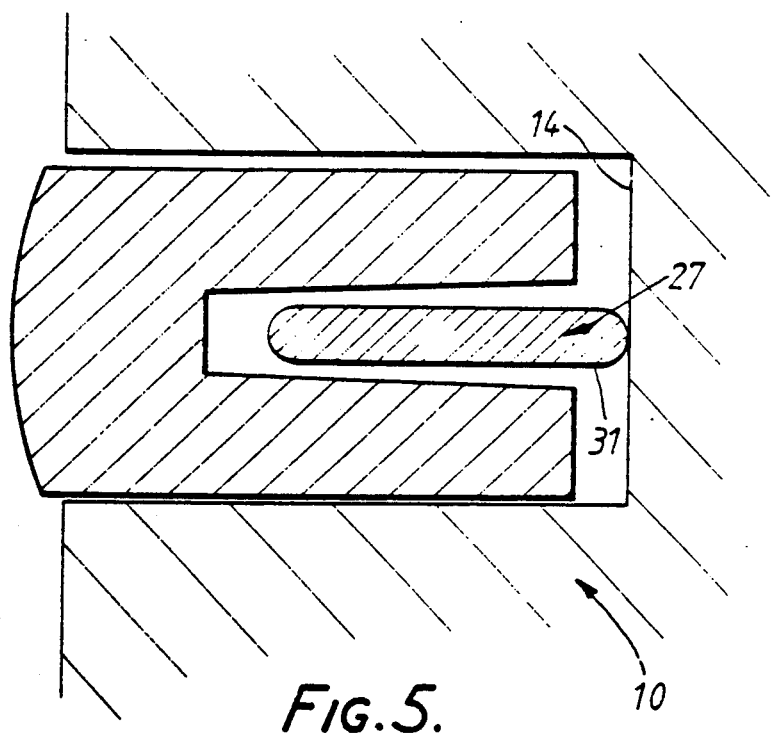
FIG. 5 shows an axial section of a first alternative form of piston and piston ring according to the invention.

Alternative embodiments are envisaged for some applications. FIG. 5 shows a piston embodiment similar to that shown in FIG. 1 but where the depression 15 of FIG. 1 has been omitted. The sealing ring 27 is still produced such that it grips the piston groove axial face 14 with an inwardly directed radial force. The degree of such force may be increased to limit substantial axial movement of the end 31 relative to the face 14.

Figure 6:
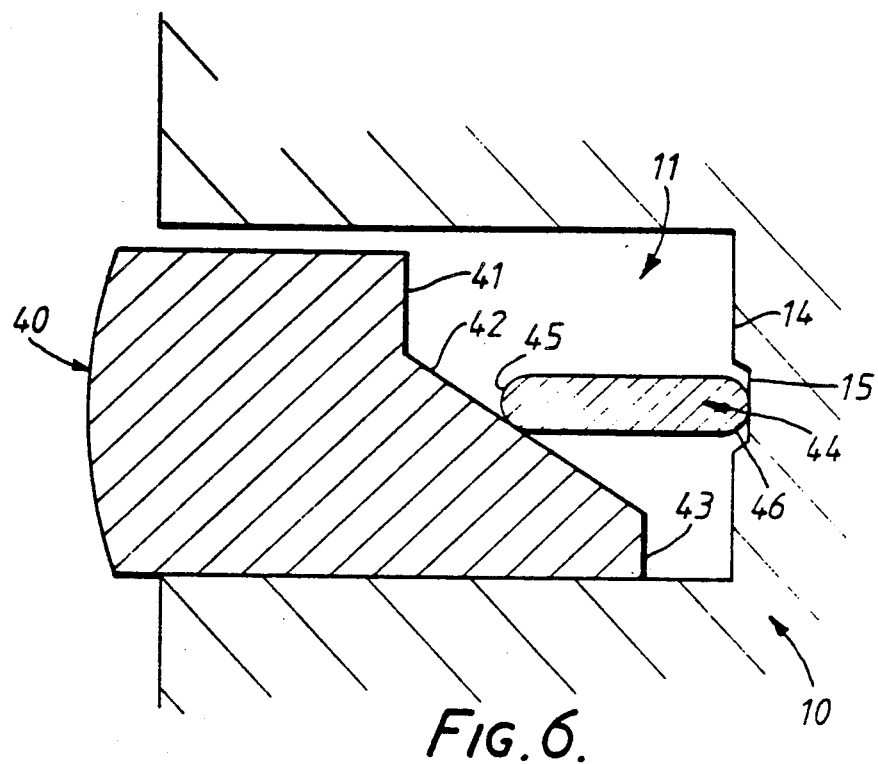
FIG. 6 shows an axial section of a second alternative form of piston and piston ring according to the invention.

A second alternative embodiment is shown in FIG. 6. In this embodiment, a main compression ring shown generally at 40 does not employ a full groove in the inner circumferential face but a rebate having an upper vertical face portion 41, a sloping face portion 42 and a lower vertical face portion 43. A sealing ring is shown generally at 44 and having rounded ends 45 and 46 is seated in a depression 15 in an axial face 14 of a circumferential piston ring groove shown generally at 11. The sealing ring 44 is dished such that it permanently grips the groove 15 with an inwardly directed radial force. The ring 44 is also formed such that the end 45 is always resiliently biased towards the sloping face portion 42 and is, under most circumstances, in contact. The resilient biasing, however, is of insufficient force to significantly restrict movement of the ring 16, either inwardly or axially in the groove 11 the biassing force being merely sufficient to maintain the end 45 in substantially constant contact with the face 42.

Figure 7:
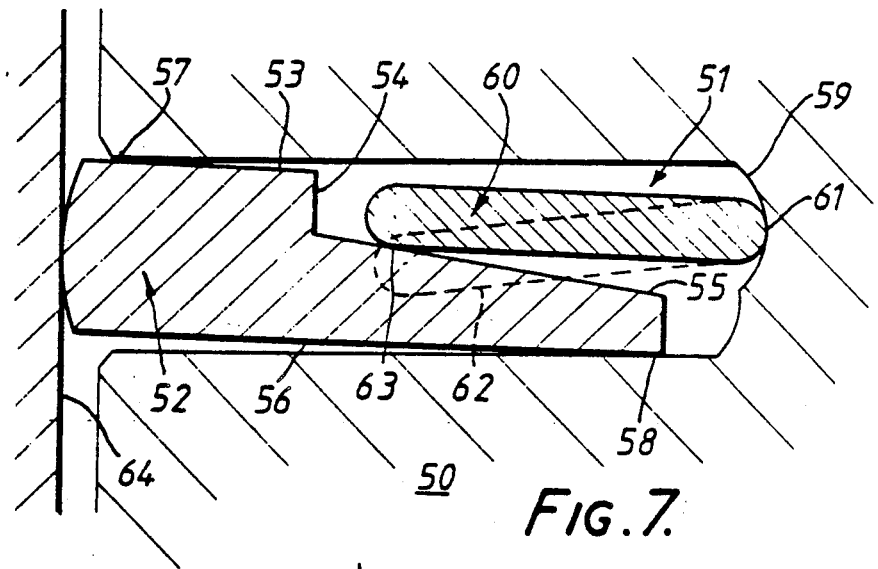
FIG. 7 shows an axial section of a third alternatiVe form of piston and piston ring according to the invention.

In a third alternative embodiment shown in FIG. 7 a piston 50 having a diameter of 74 mm is provided with a piston ring groove 51. The main compression ring 52 has a nominal axial height of 1.2 mm and a radial thickness of 3.6 mm. The ring 52 has a rebate in the upper face 53 having an upper face portion 54 and a sloping face 55. The ring 52 is slightly dished and the upper face 53 and lower face 56 touch the piston ring groove 51 at the points 57 and 58 respectively. The inner axial face of the ring groove 51 is profiled to provide in effect a supplementary groove 59 which both axially locates and provides a seat for the steel rail sealing ring 60 at one end 61. The sealing ring 60 in its free state is dished and is fitted with its natural bias in a downwardly direction. The free position of the ring 60 in the absence of the main ring 52 is shown as the dashed line 62. The radial thickness of the sealing ring 60 is about 2.75 mm and its axial thickness about 0.5 mm. With the main ring 52 and the sealing ring 60 in position the sealing ring contacts the main ring at the point 63 on the sloping face 55. In operation the composite ring behaves in the following manner: On combustion the main ring 52 is forced in a downwardly and outwardly direction such that the face 56 is held against the lower radial face of the groove 51 and the cylinder wall 64 thus sealing the combustion gases. The sealing ring is also forced in a downwardly direction increasing the sealing force at the position 63. The position of the main ring 52 on the exhaust stroke will depend upon the balance of forces operating but the sealing ring 60 is substantially always in contact with the main ring 52 at the point 63 thus maintaining an efficient gas and oil seal. On the induction stroke the main ring 52 will contact the groove 51 at the points 57 and 58 thus helping to minimise the passage of oil past the ring.

The main ring 52 shown in FIG. 7 may be manufactured from either cast iron or steel as indeed may be the main ring of any of the embodiments described. The latter material may be in the form of an extruded wire section which may be wrapped to shape with or without subsequent machining. The embodiment of FIG. 7 may be easier and thus more economic to manufacture due to the less stringent and easier to apply tolerances on the rebate of the ring 52 compared to the grooves of the embodiments shown in FIGS. 1 to 5. It will also be appreciated that this ring is of extremely low axial height and potentially further reduces the piston compression height.

Figure 8:
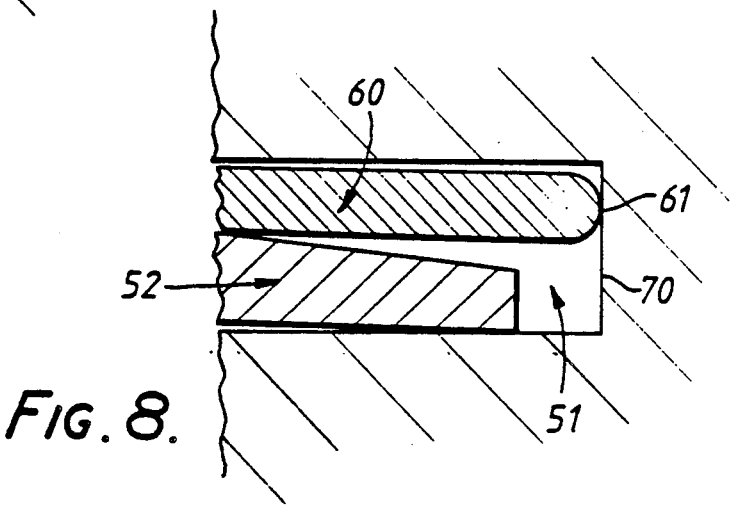
FIG. 8 shows an axial section of part of a fourth alternative form of piston and piston ring according to the invention.

FIG. 8 shows a detail of a ring and piston assembly similar to that shown in FIG. 7. In this embodiment the inner axial wall 70 of the groove 51 is flat. The sealing ring 60 seats on the wall 70 at the point 61 and the composite ring operates in essentially the same manner as the embodiment of FIG. 7. It is sufficient when assembling to ensure that the point of seating 61 of the sealing ring 60 is towards the top of the wall 70 to allow easy fitting of the main ring 52.

Figure 9:
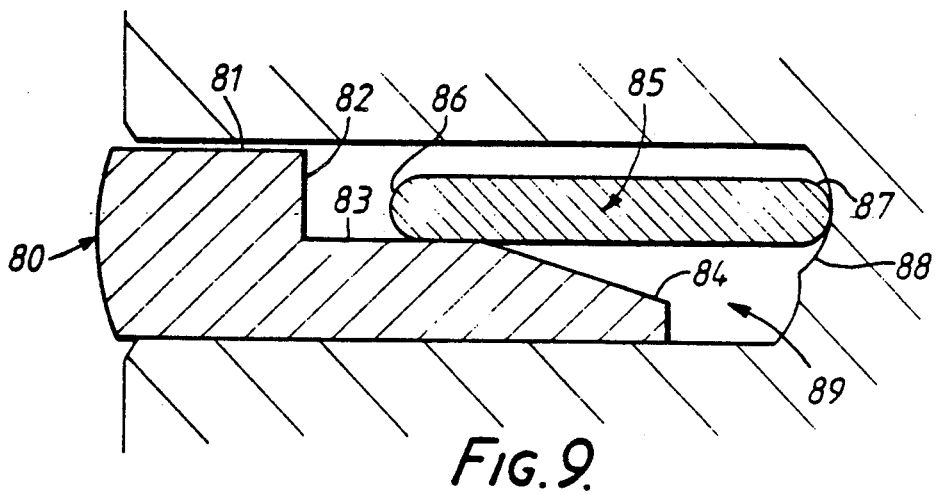
FIG. 9 shows an axial section of part of a fifth alternative form of piston and piston ring according to the invention.

In FIG. 9 the main ring 80 has a rebate in the upper face 81, the rebate having an upper face portion 82, a generally horizontal portion 83 and a sloping portion 84. The purpose of the sloping portion 84 in this embodiment is to provide a leadin during assembly for the sealing ring 85 which is dished in a downwardly direction in its free state (similar to that described with reference to FIG. 7). The end 86 of the ring 85 rests on the face portion 83 in operation. The end 87 of the ring 85 is located in a supplementary groove 88 of the piston ring groove 89.

It may be seen in all of the embodiments described that the inner sealing ring does not physically limit the extent of movement of the main compression ring within its groove. The ability of the sealing ring to pivot on its seat on the piston wall allows it to form dynamic seals with various faces of the groove or recess in the compression ring, thus enhancing the performance of the piston. Although the sealing ring has been described as being made of steel it may be made from aluminium or copper-based alloys or even some of the later engineering plastics materials an example of which is polyetheretherketone (PEEK).

In all cases the relative dimensions must be such that the main compression ring is able to fully retract into its groove under thrust conditions, resulting from piston lateral movements, without being impeded by the sealing ring. Conversely, under conditions where the main compression ring is at the furthest outward extent from its groove, the penetration of the sealing ring into the groove in the inner axial face of the main ring should preferably not be less than 1 mm.

A benefit conferred by the embodiment shown in FIG. 1 etc., is that the groove 22 is significantly easier and thus cheaper to produce by having a frusto-conical form rather than parallel radial faces.

The main ring shown in FIGS. 1 to 5 may be used in conjunction with a dished sealing ring of the type shown in FIGS. 7 to 8.

The main compression ring (16,40,52,80) may, of course, be surface treated in any known manner such as, for example, nitro-carburising, chromium or molybdenum facing to improve wear characteristics, etc.

Where the main ring is used in conjunction with a dished sealing ring it has been found that wear of the lower face of the piston ring groove in the piston body is reduced.

The invention disclosed in this specification may be further combined with piston bodies of the type disclosed in GB 2,104,188 where the piston skirt is provided with raised lands. The provision of such lands having appropriate contours allows hydrodynamic lubrication of the piston in the cylinder bore, giving reductions in friction between the piston and cylinder wall.

We claim:

1. A piston comprising:
a piston body with at least one annular piston ring groove in the piston body, said groove having two radially extending walls and an axially extending wall;
a main piston ring received in said piston ring groove, said main ring having an outer generally axially extending face for sealing engagement with an associated cylinder wall and having an inner generally axially extending face;
said main ring having a recess opening into said inner face, said recess extending in an outwardly direction toward said outer face; and
an annular auxiliary sealing ring having radially inner and outer ends defining the peripheral boundaries of said sealing ring, said sealing ring being in constant but pivotable gripping contact at its radially inner end with said axially extending wall of said annular piston ring groove such that said sealing ring is able to tilt in the axial direction to either side of the gripping contact location by axially pivoting about the gripping contact location of its radially inner end, the radially outer end of said sealing ring extending into said recess in said inner face of said main ring; the arrangement being such that said auxiliary sealing ring does not physically limit the movement of said main ring in said annular piston ring groove.

2. A piston according to claim 1 and wherein said recess in said main ring is in the form of a groove in the inner axial face thereof.

3. A piston according to claim 2 and wherein said groove in said inner axial face of the main ring is frusto-conical in section.

4. A piston according to claim 3 and wherein the groove in the main ring has upper and lower radial faces which extend at an angle of between 0° and 4° to a radial plane passing through said groove in the main ring, said upper face extending upwardly and to the outside of said groove in the main ring and said lower face extending downwardly and to the outside of said groove in the main ring.

5. A piston according to claim 2 and wherein the radial depth of said groove in the main ring is greater than 0.5 mm.

6. A piston according to claim 2 and wherein the radially outer end of said auxiliary sealing ring penetrates said groove in said inner axial face of said compression ring by at least 0.5 mm.

7. A piston according to claim 1 and wherein said axially extending wall of said piston ring groove in said piston has a circumferentially extending depression therein.

8. A piston according to claim 7 and wherein said depression has a radial depth of between 0.05 and 1.0 mm.

9. A piston according to claim 1 and wherein said auxiliary sealing ring is a steel rail.

10. A piston according to claim 9 and wherein at least the radially inner end of said steel rail section is rounded.

11. A piston according to claim 9 and wherein both ends of said steel rail section are rounded.

12. A piston according to claim 1 wherein said main ring has a top face and said recess is in the form of a rebate in the top face.

13. A piston according to claim 12 wherein said auxiliary sealing ring is dished and resiliently biassed so as to be in substantially constant contact with said main ring.

14. A piston according to claim 12 wherein said main ring is dished.

15. A piston according to claim 12 wherein said rebate in said main ring comprises a substantially horizontal portion and a sloping portion.

* * * * *